US011327972B2

(12) United States Patent
White et al.

(10) Patent No.: US 11,327,972 B2
(45) Date of Patent: May 10, 2022

(54) SYSTEMS AND METHODS FOR GENERATING SEARCH QUERIES USING TOGGLE BUTTONS ASSOCIATED WITH PRODUCT CATEGORIES

(71) Applicant: Aetna Inc., Hartford, CT (US)

(72) Inventors: Amanda White, Hartford, CT (US); Amarpreet Komal, Hartford, CT (US); Chris Williams, Hartford, CT (US); Christina Hollstein, Hartford, CT (US); Elana Pentelnik, Hartford, CT (US); Hang Xie, Hartford, CT (US); Pete Thorne, Hartford, CT (US); Ryan Lennon, Hartford, CT (US); Timothy Nachbauer, Hartford, CT (US); Warwick de Kock, Hartford, CT (US)

(73) Assignee: Aetna Inc., Hartford, CT (US)

( * ) Notice: Subject to any disclaimer, the term of this patent is extended or adjusted under 35 U.S.C. 154(b) by 22 days.

(21) Appl. No.: 16/866,186

(22) Filed: May 4, 2020

(65) Prior Publication Data
US 2021/0342340 A1   Nov. 4, 2021

(51) Int. Cl.
*G06F 3/04847* (2022.01)
*G06F 16/2455* (2019.01)
*G06F 16/248* (2019.01)
*G06F 3/0482* (2013.01)
*G06F 16/25* (2019.01)

(52) U.S. Cl.
CPC ........ *G06F 16/2455* (2019.01); *G06F 3/0482* (2013.01); *G06F 3/04847* (2013.01); *G06F 16/248* (2019.01); *G06F 16/252* (2019.01)

(58) Field of Classification Search
CPC .............. G06F 3/0482; G06F 3/04847; G06F 16/2455; G06F 16/248; G06F 16/252
See application file for complete search history.

(56) References Cited

U.S. PATENT DOCUMENTS

| | | | | |
|---|---|---|---|---|
| 6,125,353 | A * | 9/2000 | Yagasaki | G06Q 30/06 705/26.62 |
| 10,678,878 | B2 * | 6/2020 | Li | G06F 16/951 |
| 11,106,751 | B1 * | 8/2021 | Kadayam | G06Q 30/0224 |
| 2002/0004794 | A1 * | 1/2002 | Mito | G06F 16/958 |
| 2002/0152200 | A1 * | 10/2002 | Krichilsky | G06Q 30/00 |

(Continued)

*Primary Examiner* — Dino Kujundzic
(74) *Attorney, Agent, or Firm* — Leydig, Voit & Mayer, Ltd.

(57) ABSTRACT

In some instances, the disclosure provides a method for generating search queries using toggle buttons associated with product categories. The method comprises causing display of a plurality of search recommendation indicia on a graphical user interface. The search recommendation indicia includes toggle buttons associated with product categories and product indicia associated with products. The method further comprises receiving user inputs for a toggle button associated with a product category and product indicia indicating selections of products, determining whether the selected products belong to the product category, generating a search query based on the product category, the selected products, and whether the selected products belongs to the product category associated with the toggle button. Then, the method comprises providing the search query to a backend server and receiving results from the search query from the backend server.

20 Claims, 7 Drawing Sheets

(56) References Cited

U.S. PATENT DOCUMENTS

| | | | |
|---|---|---|---|
| 2003/0036927 A1* | 2/2003 | Bowen | G16H 40/20 |
| | | | 705/4 |
| 2004/0083203 A1* | 4/2004 | Kemp | G06F 16/954 |
| 2008/0306914 A1* | 12/2008 | Jensen | G06F 16/38 |
| 2012/0259742 A1* | 10/2012 | Ochiai | G06Q 30/0603 |
| | | | 705/27.1 |
| 2013/0085900 A1* | 4/2013 | Williams | G06Q 30/0601 |
| | | | 705/27.2 |
| 2014/0258285 A1* | 9/2014 | Lavine | G06F 16/29 |
| | | | 707/728 |
| 2014/0278758 A1* | 9/2014 | Christiansen | G06Q 30/0269 |
| | | | 705/7.29 |
| 2014/0344264 A1* | 11/2014 | Kenna | G06F 16/90328 |
| | | | 707/731 |
| 2015/0310526 A1* | 10/2015 | Warren | G06F 16/951 |
| | | | 705/26.62 |
| 2016/0154862 A1* | 6/2016 | Gabbai | G06F 3/0482 |
| | | | 707/722 |

* cited by examiner

SYSTEMS AND METHODS FOR GENERATING SEARCH QUERIES USING TOGGLE BUTTONS ASSOCIATED WITH PRODUCT CATEGORIES

BACKGROUND

Users may use search engines to satisfy their informational needs. For instance, a computing device may display a graphical user interface with a search box. The user may use the computing device to input their search criteria and/or terms into the search box. The computing device may generate a search query based on the user input and provide it to a backend server. The backend server may provide the results back to the computing device and the computing device may display the search results to the user.

Additionally, the computing device may display recommendations/filters to the user based on the user inputting their search terms and/or criteria into the search box. For example, after receiving user input indicating a portion of the search terms and/or criteria, the computing device may determine recommendations and display the recommendations below the search box. The computing device may generate the search criteria based on the user selecting a displayed recommendation. Furthermore, the computing device may permit the user to "remove" the recommendations. For instance, each displayed recommendation may be removable by the user. In other words, each recommendation may be associated with a user selectable indicia (e.g., user selectable indicia indicating "remove"). Based on the user selecting the user selectable indicia, the computing device may eliminate the recommendation from appearing in future search requests by the user. However, users of the graphical user interface may seek additional options to fine-tune their search queries to provide better results.

SUMMARY

In some instances, the disclosure provides a method for generating search queries using toggle buttons associated with product categories. The method is performed by a search device. The method comprises causing display of a plurality of search recommendation indicia on a graphical user interface, wherein the plurality of search recommendation indicia comprises a plurality of toggle buttons associated with a plurality of product categories and a plurality of product indicia associated with a plurality of products, wherein each of the plurality of products belongs to a product category from the plurality of product categories. The method further comprises receiving first user input associated with a toggle button of the plurality of toggle buttons, wherein the first user input indicates whether a product category of the plurality of product categories and associated with the toggle button is adopted or not adopted. The method further comprises receiving second user input associated with one or more product indicia of the plurality of product indicia, wherein the one or more product indicia indicates selections of one or more products from the plurality of products. The method further comprises determining whether the one or more selected products belong to the product category associated with the toggle button. The method further comprises generating a search query based on the product category associated with the toggle button, the one or more selected products, and whether the one or more selected products belongs to the product category associated with the toggle button. The method further comprises providing the search query to a backend server and receiving results from the search query from the backend server.

In other instances, the disclosure provides a search device. The search device comprises a processor and non-transitory computer-readable medium having processor-executable instructions stored thereon. The processor-executable instructions, when executed, facilitate causing display of a plurality of search recommendation indicia on a graphical user interface, wherein the plurality of search recommendation indicia comprises a plurality of toggle buttons associated with a plurality of product categories and a plurality of product indicia associated with a plurality of products, wherein each of the plurality of products belongs to a product category from the plurality of product categories. The processor-executable instructions, when executed, further facilitate receiving first user input associated with a toggle button of the plurality of toggle buttons, wherein the first user input indicates whether a product category of the plurality of product categories and associated with the toggle button is adopted or not adopted. The processor-executable instructions, when executed, further facilitate receiving second user input associated with one or more product indicia of the plurality of product indicia, wherein the one or more product indicia indicates selections of one or more products from the plurality of products. The processor-executable instructions, when executed, further facilitate determining whether the one or more selected products belong to the product category associated with the toggle button. The processor-executable instructions, when executed, further facilitate generating a search query based on the product category associated with the toggle button, the one or more selected products, and whether the one or more selected products belongs to the product category associated with the toggle button. The processor-executable instructions, when executed, further facilitate providing the search query to a backend server and receiving, from the backend server, results from the search query.

In yet other instances, the disclosure provides a non-transitory computer-readable medium having processor-executable instructions stored thereon. The processor-executable instructions, when executed, facilitate causing display of a plurality of search recommendation indicia on a graphical user interface, wherein the plurality of search recommendation indicia comprises a plurality of toggle buttons associated with a plurality of product categories and a plurality of product indicia associated with a plurality of products, wherein each of the plurality of products belongs to a product category from the plurality of product categories. The processor-executable instructions, when executed, further facilitate receiving first user input associated with a toggle button of the plurality of toggle buttons, wherein the first user input indicates whether a product category of the plurality of product categories and associated with the toggle button is adopted or not adopted. The processor-executable instructions, when executed, further facilitate receiving second user input associated with one or more product indicia of the plurality of product indicia, wherein the one or more product indicia indicates selections of one or more products from the plurality of products. The processor-executable instructions, when executed, further facilitate determining whether the one or more selected products belong to the product category associated with the toggle button. The processor-executable instructions, when executed, further facilitate generating a search query based on the product category associated with the toggle button, the one or more selected products, and whether the one or more selected products belongs to the product category associated with the toggle button. The processor-executable instructions, when executed, further facilitate providing the search query to a backend server and receiving, from the backend server, results from the search query.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the presented invention will now be described more fully hereinafter with reference to the accompanying FIGs., in which some, but not all, embodiments of the invention are shown. Indeed, the invention may be embodied in any different forms and should not be construed as limited to the embodiments set forth herein; rather, these embodiments are provided so that the disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more" even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on".

Figure 1:
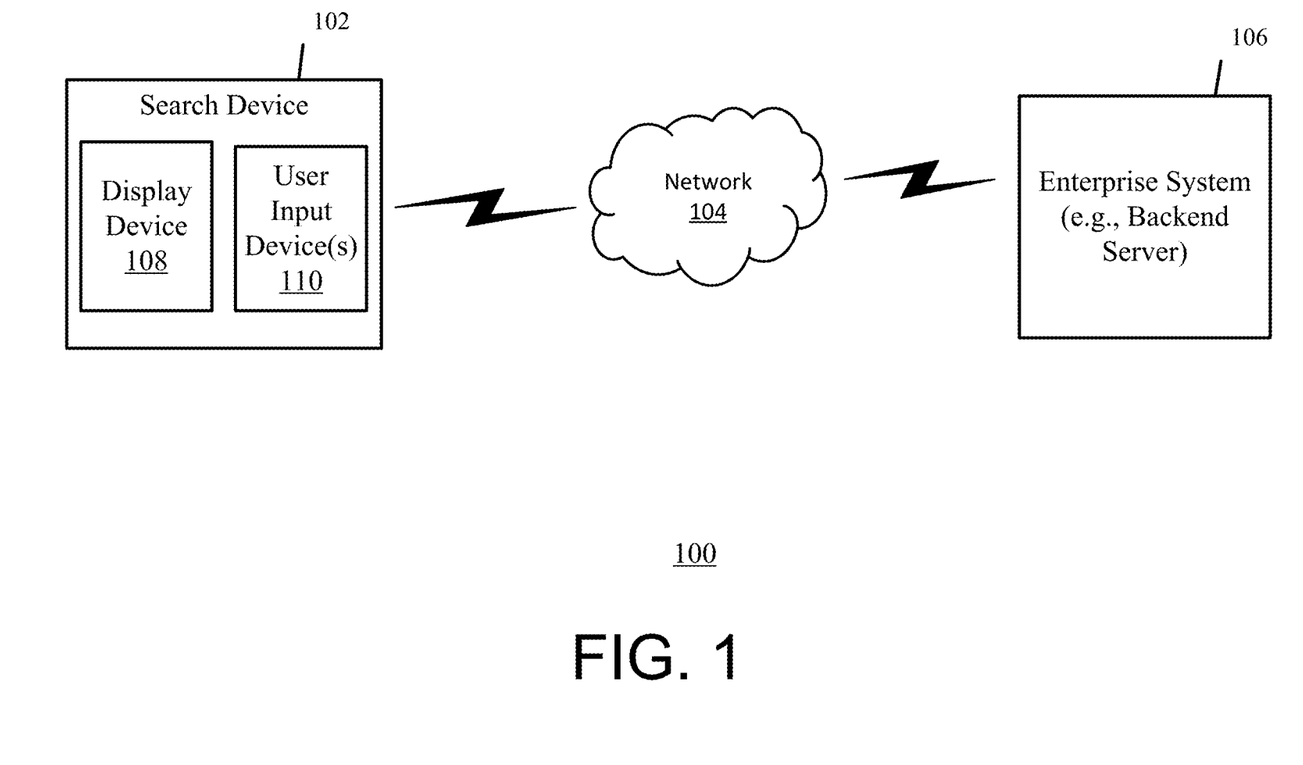
FIG. 1 is a simplified block diagram depicting an exemplary computing environment in accordance with one or more exemplary embodiments of the present application.

Systems, methods, and computer program products are herein disclosed that assist with generating search queries using toggle buttons associated with product categories. FIG. 1 is a simplified block diagram depicting an exemplary environment 100 in accordance with an exemplary embodiment of the present application. The environment 100 includes a search device 102, network 104, and an enterprise system 106 such as a backend server.

The search device 102 and the enterprise system 106 may be operatively coupled to and/or in communication with each other via the network 104. The network 104 may be a global area network (GAN) such as the Internet, a wide area network (WAN), a local area network (LAN), or any other type of network or combination of networks. The network 104 may provide a wireline, wireless, or a combination of wireline and wireless communication between the systems and/or other components within the environment 100 including between the search device 102 and the enterprise system 106.

The search device 102 may be a user device and may communicate and/or provide search information such as search queries to the enterprise system 106. The search device 102 may include at least one display device 108 and at least one user input device 110. For example, the search device 102 may cause display of a graphical user interface to a user using the display device 108. The graphical user interface may include product categories, product category indicia such as toggle buttons, individual products, and product indicia such as check boxes associated with the individual products. The user input device(s) 110 may include, but are not limited to, a mouse, keyboard, touchscreen, microphone or other voice capturing devices, and/or other types of user input devices 110 capable of capturing and/or detecting user inputs. The user may use the user input devices 110 to provide user inputs to the search device 102. The user input may indicate a first user selection associated with one or more toggle buttons associated with the product categories, a second user selection indicating product indicia associated with the products, and/or an additional user selection indicating a status change selection for the individual products. For example, the second user selection may select a product to be included within a generated search query. The additional user selection (e.g., third user selection) may be to change a status of the product indicia to be different from the statuses of the other products within the corresponding product category. Based on the user input, the search device 102 may generate search queries and provide the search queries to the enterprise system 106. The search device 102 may receive search results from the enterprise system 106 and display the results using the display device 108.

In some instances, the display device 108 and/or the user input device 110 may be separate entities that communicate with the search device 102. For example, the search device 102 may be in communication with the display device 108 and/or the user input device 110 using a wireless connection and/or a wired connection. The search device 102 may generate the search queries and cause display of the results on the display device 108 using the wireless connection and/or the wired connection.

The search device 102 may be and/or include, but is not limited to, a desktop, laptop, tablet, mobile device (e.g., smartphone device, or other mobile device), smart watch, an internet of things (IOT) device, or any other type of computing device that generally comprises one or more communication components, one or more processing components, and one or more memory components. The search device 102 may be able to execute software applications managed by, in communication, and/or otherwise associated with the enterprise organization.

The enterprise system 106 includes one or more computing devices, computing platforms, systems, servers, network elements, and/or other apparatuses capable of performing tasks, functions, and/or other actions for an enterprise organization. The enterprise organization may be any type of corporation, company, organization, and/or other institution. In some instances, the enterprise system 106 may, for example, receive search information such as the search queries from the user device 104, determine search results based on the search information, and provide the search results back to the user device 104.

It will be appreciated that the exemplary environment depicted in FIG. 1 is merely an example, and that the principles discussed herein may also be applicable to other situations—for example, including other types of institutions, organizations, devices, systems, and network configurations. For instance, in another configuration, the enterprise system 106 may be separated into multiple different entities that may communicate using the network 104. Additionally, and/or alternatively, another search device may be included within the environment 100. For instance, instead of providing the search results back to the search device 102 that provided the search query, the enterprise system 106 may provide the search results to a different device. The other device may be associated with the same user that used the search device 102 or a different user.

Figure 2:
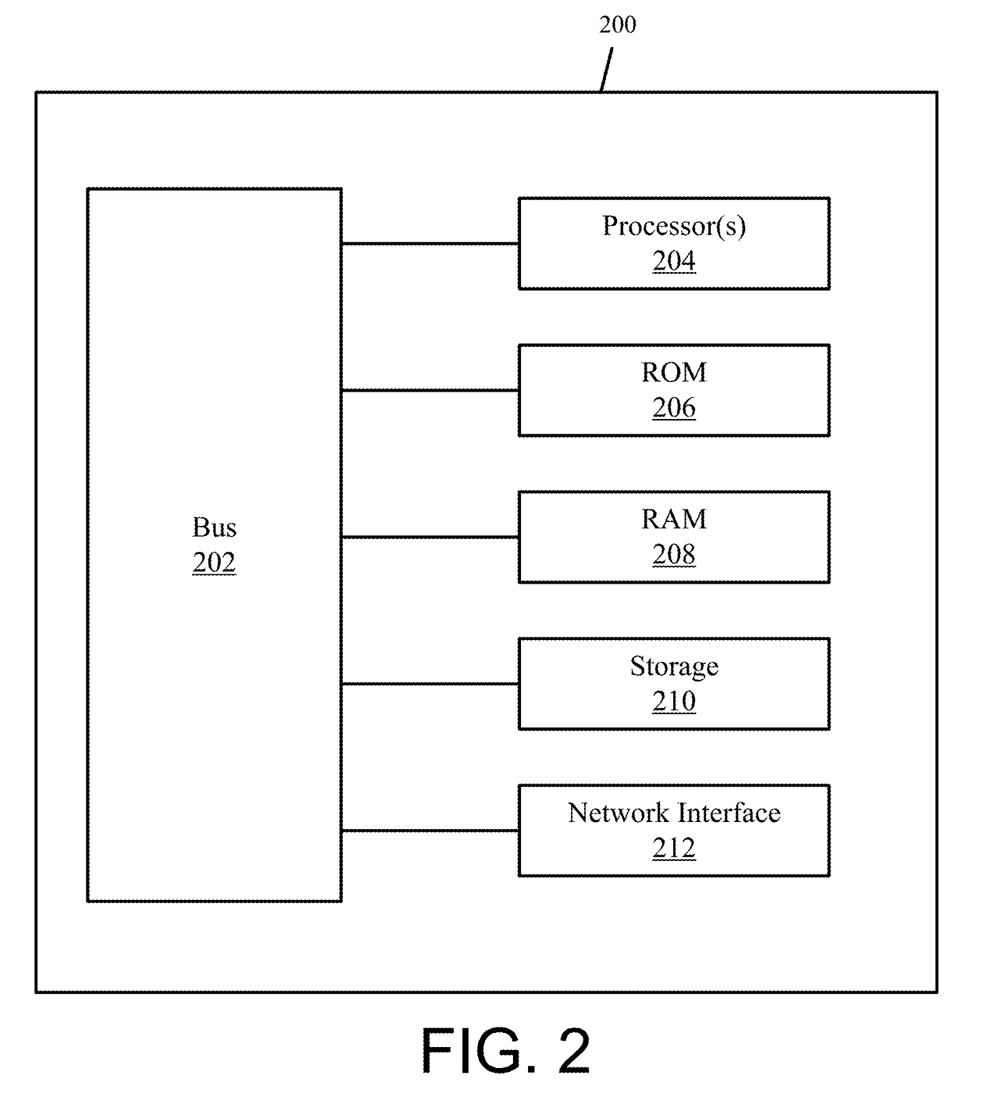
FIG. 2 is a simplified block diagram of one or more devices or systems within the exemplary system of FIG. 1.

FIG. 2 is a simplified block diagram of an exemplary device and/or system 200 within the environment 100. For example, the exemplary device and/or system 200 may be the search device 102 and/or the enterprise system 106 from environment 100. The exemplary device and/or system 200 includes a processor 204, such as a central processing unit (CPU), controller, and/or logic, that executes computer executable instructions for performing the functions, processes, and/or methods described above. In some examples, the computer executable instructions are locally stored and accessed from a non-transitory computer readable medium, such as storage 210, which may be a hard drive or flash drive. Read Only Memory (ROM) 206 includes computer executable instructions for initializing the processor 204, while the random-access memory (RAM) 208 is the main memory for loading and processing instructions executed by the processor 204. The network interface 212 may connect to a wired network or cellular network and to a local area network or wide area network, such as the network 104. The system 200 may also include a bus 202 that connects the processor 204, ROM 206, RAM 208, storage 210, and/or the network interface 212. The components within the exemplary device and/or system 200 may use the bus 202 to communicate with each other. The components within the exemplary device and/or system 200 might not be inclusive of every device and/or component within the device and/or system 200 of the environment 100. For example, the search device 102 may include the additional components and/or devices that are described above in FIG. 1, including the display device 108 and the user input device(s) 110. The system of FIG. 2 may be used to implement the methods and systems described herein.

Figure 3:
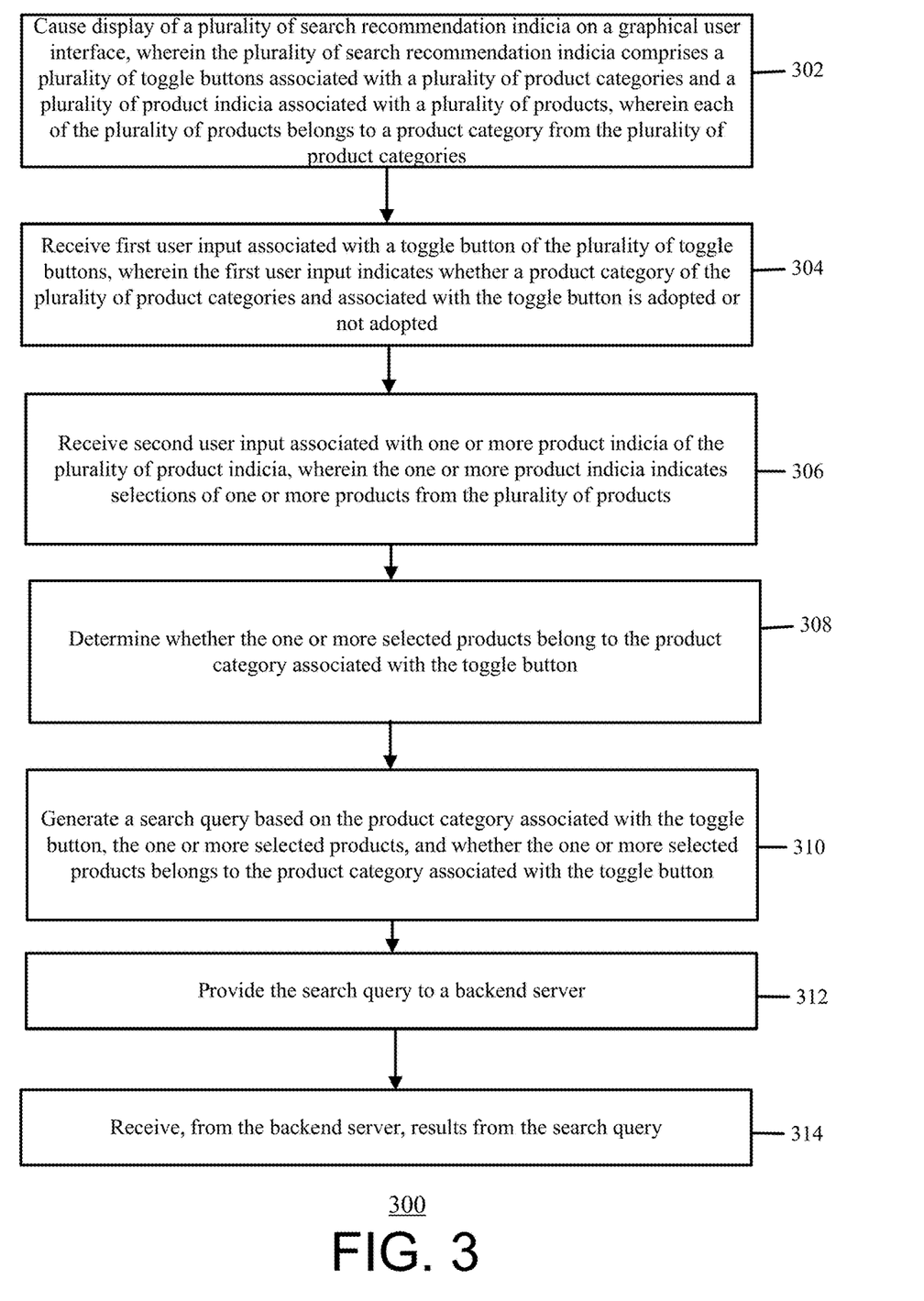
FIG. 3 is an exemplary flowchart for generating search queries using toggle buttons associated with product categories in accordance with one or more exemplary embodiments of the present application.
Figure 4A:
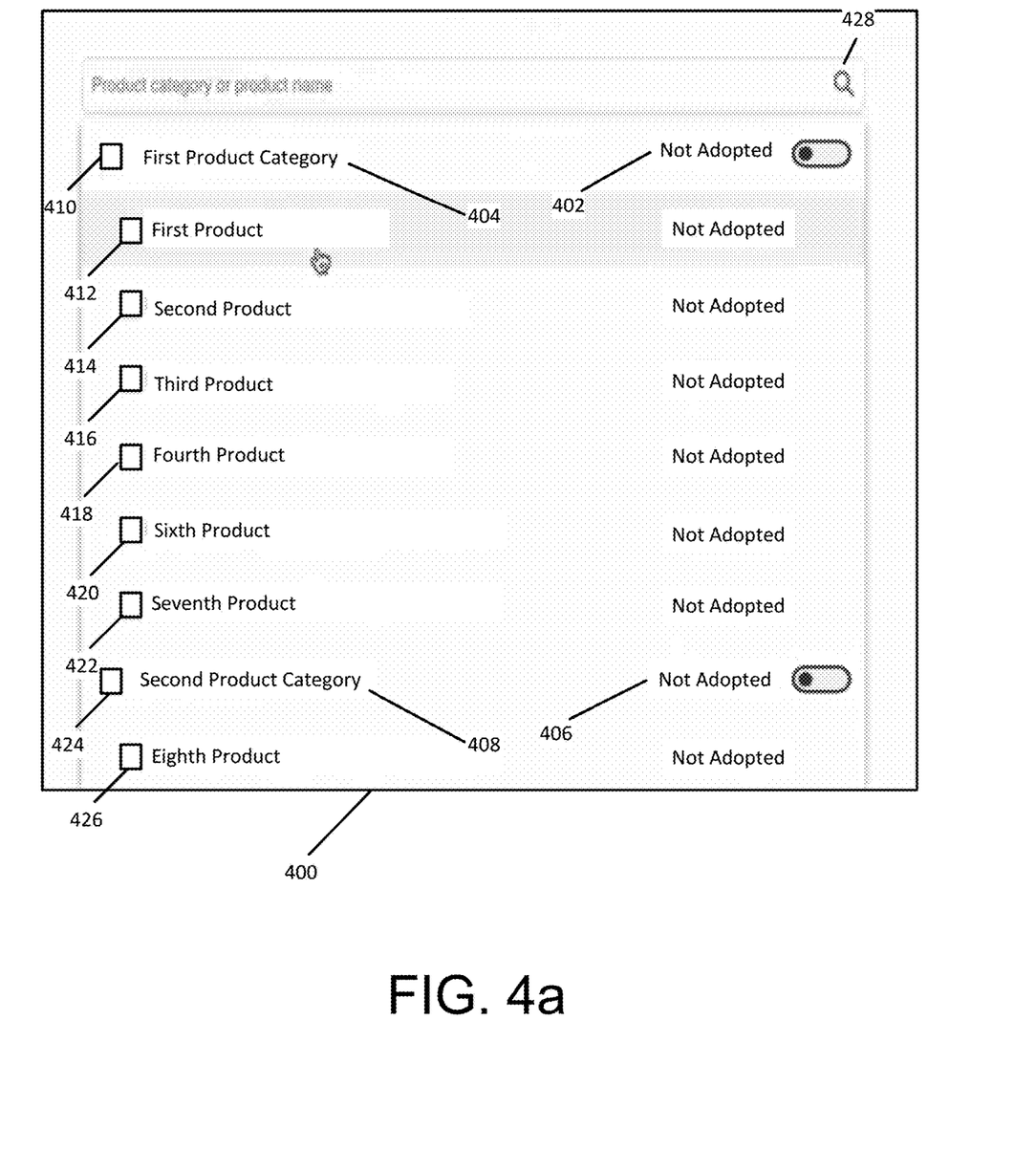
FIGS. 4a-4c are exemplary graphical user interfaces used for generating search queries using toggle buttons associated with product categories in accordance with one or more exemplary embodiments of the present application.
Figure 4B:
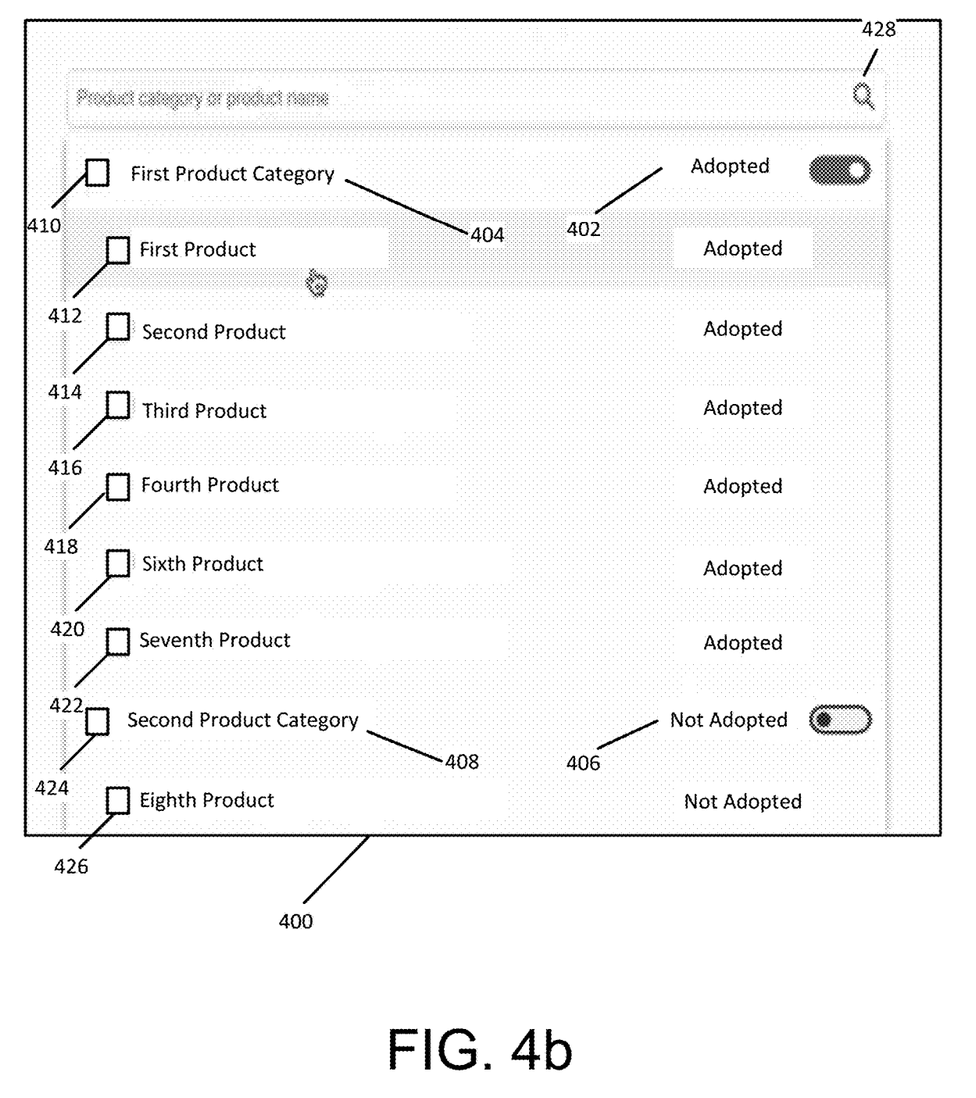
Figure 4C:
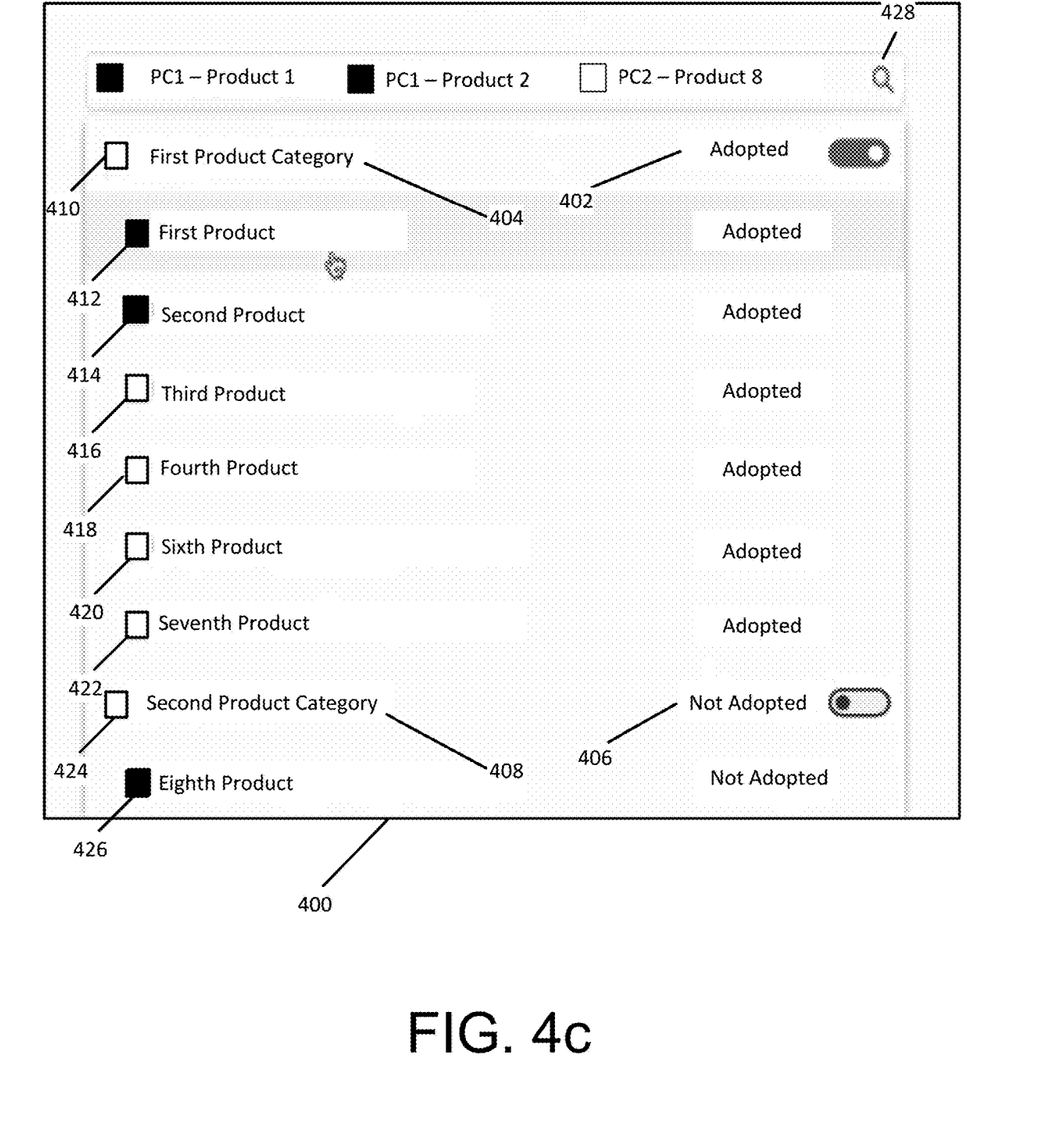

FIG. 3 is a flowchart illustrating an exemplary process 300 for generating search queries using toggle buttons associated with product categories in accordance with one or more exemplary embodiments of the present application. The process 300 may be performed by the environment 100; however, it will be recognized that any suitable environment may be used and that any of the following blocks may be performed in any suitable order. FIG. 3 will be described with reference to FIGS. 4a-4c. However, the descriptions and graphical user interfaces from FIGS. 4a-4c are merely exemplary and the process 300 may use other descriptions, illustrations, and processes.

At block 302, the search device 102 may cause display of a plurality of search recommendation indicia on a graphical user interface. The plurality of search recommendation indicia comprises a plurality of toggle buttons associated with a plurality of product categories and a plurality of product indicia associated with a plurality of products.

Further, each of the plurality of products belongs to a product category from the plurality of product categories. In other words, the search device 102 may cause display of the graphical user interface on a display device 108 such as a monitor, desktop screen, laptop screen, touchscreen, mobile device/smartphone screen, and/or other type of display devices 108 that permits the search device 102 to display information. The graphical user interface includes a plurality of product categories and a plurality of products. The product categories may be any categorical representation of medical products, insurance products, and/or types of products used, managed, sold, and/or otherwise related to the enterprise organization. The products include, but are not limited to physical products, goods provided by the enterprise organization, services provided by the enterprise organization, information gathered by the enterprise organization and provided by the enterprise organization, programs provided by the enterprise organization, and/or insurance/medical related products. In some instances, the products and product categories may be associated with medical products and product categories and/or insurance products and product categories.

Furthermore, the graphical user interface includes multiple different user selectable indicia. The user selectable indicia may be, but are not limited to, user selectable boxes (e.g., checkboxes), toggle buttons, and/or other types of indicia that permit the user to alter and/or individualize the search parameters. Each of the user selectable indicia may be associated with a product category or a product. For instance, each of the product categories may have a corresponding toggle button. The toggle button may be binary and indicate a status for the products and/or product categories. In a first position (e.g., "On"), the toggle button may indicate the product category is "Adopted." In the second position (e.g., "Off"), the toggle button may indicate the product category is "Not Adopted." The "Adopted" position for the product category indicates that a client has enrolled in the corresponding product. The "Not Adopted" position for the product category indicates that the client has not enrolled in the corresponding product. Additionally, and/or alternatively, each of the products may also have a corresponding product indicia. As will be explained below, the search device 102 may use the user selectable indicia such as the product indicia and the toggle buttons associated with the product categories to generate the search queries.

FIG. 4a shows an exemplary graphical user interface 400 that includes a plurality of search recommendation indicia and will be used to describe block 302 in further detail. The search device 102 may cause display of the graphical user interface 400 on a display device 108. The display device 108 may be included within the search device 102. For instance, the display device 108 may be a laptop or desktop screen and the search device 102 may be the laptop or desktop. Additionally, and/or alternatively, the display device 108 may be separate from the search device 102. For example, the display device 108 may be a second monitor that is connected to the search device 102 or the display device 108 may be connected via the network 104 to the search device 102.

The graphical user interface 400 may include a plurality of search recommendations including product categories 404 and 408 and different products 412-422 and 426.

Furthermore, for each of the product categories, the graphical user interface may include a toggle button associated with that particular product category. For example, the first product category 404 may have the associated toggle button 402 and the second product category 408 may have the associated toggle button 406. Additionally, the product categories 404 and 408 may also have a corresponding selection indicia 410 and 424. The indicia 410 and 424 may select all of the products within the associated product category. For example, by selecting indicia 410, the search device 102 may indicate that products 412-422, which are associated with the first product category, are also selected. Further, each of the products 412-422 and 426 may also have a corresponding product indicia. The search device 102 uses the user inputs for the toggle buttons 402, 406 and/or indicia 410, 424 to determine the search parameters for the first product category 406 and the second product category 408. Further, the search device 102 uses the user inputs for the product indicia for the products 412-422 and 426 to determine the search parameters for the different products 412-422 and 426.

Referring back to FIG. 3, at block 304, the search device 102 may receive first user input associated with one or more toggle buttons of the plurality of toggle buttons. The first user input indicates whether the product categories associated with the toggle buttons are "Adopted" or "Not Adopted." For example, a user may use a user input device 110 such as a touchscreen or mouse to toggle a toggle button on the graphical user interface from "Not Adopted" to "Adopted" or from "Adopted" to "Not Adopted."

FIG. 4b shows the exemplary graphical user interface 400 and will be used to describe block 304 in further detail. For instance, the search device 102 receives first user input to change the toggle button 406 from "Not Adopted" to "Adopted." After receiving the first user input, the search device 102 may cause display of the graphical user interface 400 shown on FIG. 4b indicating the toggle button 406 has been changed to "Adopted."

Additionally, the individual products may be categorized into different product categories. For instance, the first product category 404 may include products 412-422 (e.g., first, second, third, fourth, fifth, sixth, and seventh products). Based on receiving the first user input for the toggle button (i.e., toggle switch) 402, the search device 102 may cause display of the graphical user interface 400 indicating the individualized products 412-422 for the first product category 404 have also been changed (e.g., changing from "Not Adopted" to "Adopted").

In some variations, the search device 102 may receive one or more additional user inputs indicating status changes for one or more products from the plurality of products. These additional user inputs may be used such that the products may have a different status (e.g., "Not Adopted") as compared to the product category and/or other products within the product category (e.g., product category and other products may be "Adopted"). For example, in addition to the product categories having associated toggle switches (e.g., switches 402 and 406 shown in FIGS. 4a-4c), each of the products may also have associated toggle switches. The toggle switches associated with the products may change the status of the products such as from "Adopted" to "Not Adopted" or from "Not Adopted" to "Adopted." In other words, the search device 102 may receive user input indicating a status change for an entire product category (e.g., "Adopted" to "Not Adopted") and/or additional user inputs indicating a status change for an individual product within the product category (e.g., "Not Adopted" to "Adopted").

The search device 102 may generate the search query based on using the toggle switches and/or other indicia that change the statuses of the individual products. For instance, based on receiving user input for the toggle switches for the individual products, the statuses of the products may be different from the product category associated with the product and/or the other products within the product category. The search device 102 may use this difference to generate the search query.

Referring back to FIG. 3, at block 306, the search device 102 may receive second user input associated with one or more product indicia that indicates selections of one or more products from the plurality of products. For example, the first user input indicates whether the product categories associated with the toggle buttons are "Adopted" or "Not Adopted." The second user input indicates whether the individual products from the products categories are to be selected for the search query.

FIG. 4c shows the exemplary graphical user interface 400 and will be used to describe block 306 in further detail. For instance, after receiving the first user input to change the toggle button 406 from "Not Adopted" to "Adopted," the search device 102 may receive second user input indicating the product indicia identifying different products that have been selected such as the first product 412, the second product 414 and the eight product 426. After receiving the first and second user input, the search device 102 may cause display of the graphical user interface 400 shown on FIG. 4c indicating a change (e.g., shading) for these products 412, 414, and 426. Additionally, based on the second user input indicating the selection of the first product 412, the graphical user interface 400 may include these products 412, 414, and 426 on the search bar (e.g., "PC1—Product 1," "PC1—Product 2," and "PC2—Product 8").

In some examples, the search device 102 may receive the first user input for the toggle switches associated with the product categories prior to receiving the second user input for the checkboxes associated with the individualized products. In other examples, the search device 102 may receive the second user input for the individualized products prior to receiving the first user input for the toggle switches.

Referring back to FIG. 3, at block 308, the search device 102 may determine whether the one or more selected products belong to the product category associated with the toggle button from the first user input. In other words, the search device 102 may determine the association between the first and second user inputs. For example, the search device 102 may determine the selected product category associated with the first user input (e.g., first product category 404 associated with the user input for the toggle switch 402). The search device 102 may determine the selected product(s) associated with the second user input (e.g., the first product 412, the second product 414, and the eighth product 426). Then, using the first and second user inputs, the search device 102 may determine the association between the first and second user inputs. In other words, the search device 102 may determine whether the product(s) identified in the second user input are within the product category from the first user input (e.g., first product category 404). For instance, referring to FIG. 4c, the search device 102 may determine the first product 412 and the second product 414 are within the first product category 404, but the eighth product 426 is not within the first product category 404 and belongs to the second product category 408.

Referring back to FIG. 3, at block 310, the search device 102 may generate a search query based on the product category associated with the toggle button, the one or more selected products, and whether the one or more selected products belongs to the product category associated with the toggle button. For example, the search device 102 may use the first user inputs to determine whether the product categories have been "Adopted" or "Not Adopted." For instance, referring to FIG. 4c, based on the first user input, the search device 102 may determine the first product category 404 has been "Adopted" and the second product category 408 has been "Not Adopted."

Using the second user inputs, the search device 102 may determine user selections for the individualized products. For instance, again referring to FIG. 4c, the search device 102 may determine that the second user input indicates the first product 412, the second product 414, and the eight product 426 have been selected.

Then, the search device 102 may generate the search query based on whether the user indicated product categories and products are in the same categories and/or with the same status. In some examples, the search device 102 may use a conditional "OR" operation for products that are in the same product category and have the same status. For example, the first and second products 412 and 414 are in the same category and have the same status (e.g., "Adopted"). The search device 102 may generate a search query using the conditional "OR" operation for the first and second products 412 and 414. Additionally, and/or alternatively, the search device 102 may use a conditional "AND" for products that are in the same category, but have different statuses (e.g., in examples where each product has individualized toggle switches, the products within the categories may have a different status from the product category and/or other products within the category and thus, the search device may use a conditional "AND").

Additionally, and/or alternatively, the search device 102 may also use a conditional "AND" for products within different categories. For example, the first product 412 is "Adopted" and the eighth product 426 is "Not Adopted." Further, they are in different product categories (e.g., the first product 412 is in the first product category 404 and the eighth product 426 is in the second product category 408). As such, the search device 102 may generate a search query using the conditional "AND" operation for the first and eighth products 412 and 426 (e.g., "Adopted" for the first product 412 AND "Not Adopted" for the eighth product 426). Additionally, and/or alternatively, the search device 102 may use a conditional "AND" for products within different categories regardless of whether the products have different statuses. For instance, regardless if the first product 412 and the eighth product 426 have the same status (e.g., both of them are "Adopted" or "Not Adopted") or different statuses (e.g., one of them is "Adopted" and the other is "Not Adopted"), the search device 102 may use a conditional "AND" for these two products.

In some examples, the search device 102 may receive an additional user input (e.g., third user input) after generating the search query. The additional user input may be for a toggle button that switches a status of a product category such as changing the status from "Adopted" to "Not Adopted" or from "Not Adopted" to "Adopted." Furthermore, the search device 102 may modify the generated search query based on the additional user input. For example, based on the status change for the product category, the search device 102 may modify the individualized products within the product category as well. For instance, referring to FIG. 4c, the search device 102 may receive a third user input indicating the toggle button 406 has been changed to "Adopted." The search device 102 may determine products associated with the product category for the toggle button 406 (e.g., products within the second product category 408). The search device 102 may then change the search query for the products associated with the second product category 408 such as the eighth product 426 from "Not Adopted" to "Adopted." Additionally, and/or alternatively, the search device 102 may receive another user input indicating the toggle button 402 has been changed to "Not Adopted." The search device 102 may then change the search query for all the products associated with the first product category 404 from "Adopted" to "Not Adopted."

In some variations, the search device 102 might not generate the search query until it receives another user input. For example, the search device 102 may receive the new user input indicating to generate the search query. Referring to FIG. 4c, the search device 102 might not generate the search query until the user selects the magnifying glass 428. Based on or in response to receiving the third user input (e.g., the magnifying glass 428), the search device 102 may generate the search query.

Referring back to FIG. 3, at block 312, after generating the search query, the search device 102 may provide the search query to a backend server such as the enterprise system 106. For example, the search device 102 may use the network 104 to provide the search query to the enterprise system 106. In some instances, the search device 102 uses an application programming interface (API) call to the backend server. The frontend (e.g., the search device 102) sends the search query and all product information including any search options selected to the backend server. Based on the search query, the enterprise system 106 may determine clients that satisfy the criteria from the search query. For example, referring to FIG. 4c, the search device 102 may generate a search query for clients that have "Adopted" the first product 412/the second product 414 and have "Not Adopted" the eighth product 426. Based on the search query, the enterprise system 106 may make a specified database call to determine clients that these parameters. Then, the enterprise system 106 may provide, back to the search device 102, the search results such as the clients that have "Adopted" the first and second products 412, 414 and have "Not Adopted" the eighth product 426.

Additionally, and/or alternatively, the search device 102 may generate the search query using a programming language or format such as JavaScript Object Notation (JSON) object. In other words, the search device 102 may provide a JSON object to the enterprise system 106, and the enterprise system 106 may use the JSON object to make a specified database call to determine the search results.

At block 314, the search device 102 may receive, from the backend server (e.g., the enterprise system 106), the search results from the search query. Then, the search device 102 may cause display of the search results on the display device 108 such as displaying the clients that have "Adopted" the first and second products 412, 414 and have "Not Adopted" the eighth product 426.

Figure 5:
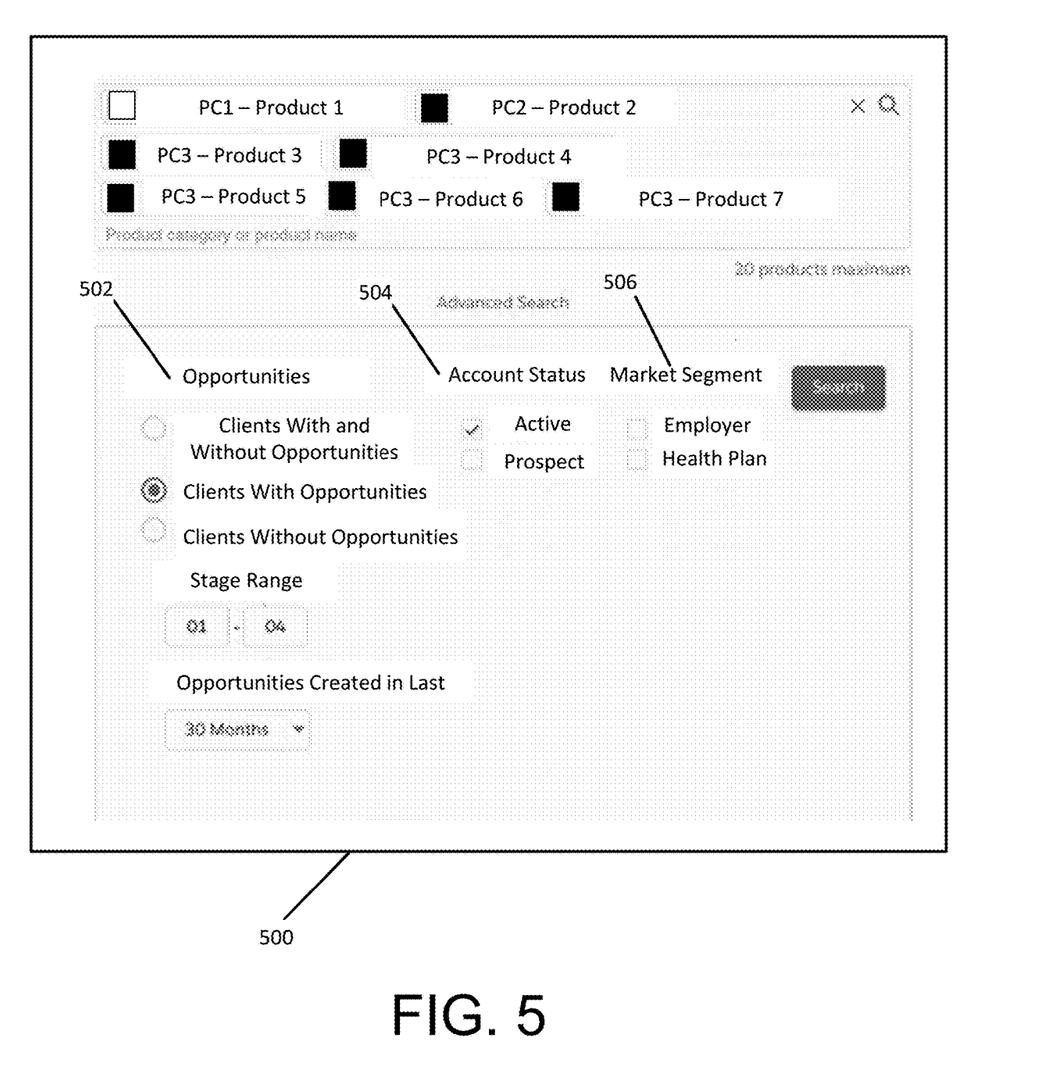
FIG. 5 is another exemplary graphical user interface used for generating search queries in accordance with one or more exemplary embodiments of the present application.

FIG. 5 shows a graphical user interface 500 used for generating search queries in accordance with one or more exemplary embodiments of the present application. For example, the search device 102 may receive user input indicating selection of the products including "Not Adopted" for the first product in the first product category ("PC1—Product 1") and "Adopted" for the other products in the other product categories (e.g., second product in second product category ("PC2—Product 2"), third product in third product category ("PC3—Product 3"), fourth product in third product category ("PC3—Product 4"), fifth product in third product category ("PC3—Product 5"), sixth product in third product category ("PC3—Product 6"), and seventh product in third product category ("PC3—Product 7"). Further, the search device 102 may also receive user input indicating an advanced search selection. In response to these user inputs, the search device 102 may cause display of the graphical user interface 500 that includes the selection of products in the search bar and the advanced search option.

The search device 102 may use the graphical user interface 500 with the advanced search option to provide additional refinements and/or changes to the search query. For instance, the search device 102 may use the selections under the "Opportunities" heading 502 to refine the search query to determine clients with and/or without opportunities. For example, an opportunity may be an opportunity (e.g., potential new products) for a new client and/or for an existing client. For instance, if a client expresses interest in cost reduction for a department, an employee may create an opportunity for the client based on products that may assist with reducing costs within the department. The opportunities heading 502 may be used to filter clients based on whether there are identified opportunities for the client.

Further, the search device 102 may use the selections under the "Account Status" heading 504 to refine the search query to determine clients that have "Active" accounts and or "Prospect" accounts. In other words, based on the search device 102 receiving user input indicating "Active" accounts, the search device 102 may provide a search query to the enterprise system 106 indicating for it to determine search results only for active clients. Based on the search device 102 receiving user input indicating "Prospect" accounts, the search device 102 may provide a search query to the enterprise system 106 indicating for it to determine search results only for prospective clients.

Also, the search device 102 may use the selections under the "Market Segment" heading 506 to refine the search query to determine a type of client or a group of clients that share one or more common characteristics that are grouped together for marketing purposes. Using the "Market Segment" heading 506, the search device 102 may generate a search query that filters clients between different market segments.

It will be appreciated that the figures of the present application and their corresponding descriptions are merely exemplary, and that the invention is not limited to these exemplary situations.

It will further be appreciated by those of skill in the art that the execution of the various machine-implemented processes and steps described herein may occur via the computerized execution of processor-executable instructions stored on a non-transitory computer-readable medium, e.g., random access memory (RAM), read-only memory (ROM), programmable read-only memory (PROM), volatile, nonvolatile, or other electronic memory mechanism. Thus, for example, the operations described herein as being performed by computing devices and/or components thereof may be carried out by according to processor-executable instructions and/or installed applications corresponding to software, firmware, and/or computer hardware.

The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

It will be appreciated that the embodiments of the invention described herein are merely exemplary. Variations of these embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method, comprising:
   causing, by a search device, display of a plurality of search recommendation indicia on a graphical user interface, wherein the plurality of search recommendation indicia comprises a plurality of toggle buttons associated with a plurality of product categories and a plurality of product indicia associated with a plurality of products, wherein each of the plurality of products belongs to a product category from the plurality of product categories;
   receiving, by the search device, first user input associated with a toggle button of the plurality of toggle buttons, wherein the first user input indicates that a first product category from the plurality of product categories is adopted;
   receiving, by the search device, second user input associated with one or more product indicia of the plurality of product indicia, wherein the one or more product indicia indicates selections of one or more products from the plurality of products;
   determining, by the search device and based on the one or more selected products and the first product category, a first set of products, of the plurality of products, that belong to the first product category and a second set of products, of the plurality of products, that do not belong to the first product category;
   generating, by the search device, a search query based on the first product category, the first set of products, and the second set of products, wherein the search query uses a first conditional statement for products belonging to the first set of products and a second conditional statement for products belonging to the second set of products;
   providing, by the search device, the search query to a backend server; and
   receiving, by the search device and from the backend server, results from the search query.

2. The method of claim 1, further comprising:
   determining, based on the first user input, that the first product category is adopted;

determining, based on the first user input, that a second product category from the plurality of product categories is not adopted.

3. The method of claim 1, wherein the first conditional statement for the products belonging to the first set of products is a conditional OR statement.

4. The method of claim 1, further comprising:
receiving third user input associated with a second toggle button from the plurality of toggle buttons, wherein the third user input indicates that a second product category from the plurality of product categories is adopted; and
modifying the generated search query based on the third user input.

5. The method of claim 4, wherein modifying the generated search query comprises:
determining a third set of products, of the plurality of products, that belong either to the first product category or the second product category; and
modifying the search query to use the first condition statement for products belonging to the third set of products.

6. The method of claim 1, wherein the second conditional statement for the products belonging to the second set of products is a conditional AND statement.

7. The method of claim 1, wherein the search query is a JSON object.

8. A search device, comprising:
a processor; and
non-transitory computer-readable medium having processor-executable instructions stored thereon, wherein the processor-executable instructions, when executed, facilitate:
causing display of a plurality of search recommendation indicia on a graphical user interface, wherein the plurality of search recommendation indicia comprises a plurality of toggle buttons associated with a plurality of product categories and a plurality of product indicia associated with a plurality of products, wherein each of the plurality of products belongs to a product category from the plurality of product categories;
receiving first user input associated with a toggle button of the plurality of toggle buttons, wherein the first user input indicates that a first product category from the plurality of product categories is adopted;
receiving second user input associated with one or more product indicia of the plurality of product indicia, wherein the one or more product indicia indicates selections of one or more products from the plurality of products;
determining, based on the one or more selected products and the first product category, a first set of products, of the plurality of products, that belong to the first product category and a second set of products, of the plurality of products, that do not belong to the first product category;
generating a search query based on the first product category, the first set of products, and the second set of products, wherein the search query uses a first conditional statement for products belonging to the first set of products and a second conditional statement for products belonging to the second set of products;
providing the search query to a backend server; and
receiving, from the backend server, results from the search query.

9. The search device of claim 8, wherein the processor-executable instructions, when executed, further facilitate:
determining, based on the first user input, that the first product category is adopted;
determining, based on the first user input, that a second product category of the plurality of product categories is not adopted.

10. The search device of claim 8, wherein the first conditional statement for the products belonging to the first set of products is a conditional OR statement.

11. The search device of claim 8, further comprising:
receiving third user input associated with a second toggle button from the plurality of toggle buttons, wherein the third user input indicates that a second product category from the plurality of product categories is adopted; and
modifying the generated search query based on the third user input.

12. The search device of claim 11, wherein modifying the generated search query comprises:
determining a third set of products, of the plurality of products, that belong either to the first product category or the second product category;
modifying the search query to use the first condition statement for products belonging to the third set of products.

13. The search device of claim 8, wherein the second conditional statement for the products belonging to the second set of products is a conditional AND statement.

14. The search device of claim 8, wherein the search query is a JSON object.

15. A non-transitory computer-readable medium having processor-executable instructions stored thereon, wherein the processor-executable instructions, when executed, facilitate:
causing display of a plurality of search recommendation indicia on a graphical user interface, wherein the plurality of search recommendation indicia comprises a plurality of toggle buttons associated with a plurality of product categories and a plurality of product indicia associated with a plurality of products, wherein each of the plurality of products belongs to a product category from the plurality of product categories;
receiving first user input associated with a toggle button of the plurality of toggle buttons, wherein the first user input indicates that a first product category from the plurality of product categories is adopted;
receiving second user input associated with one or more product indicia of the plurality of product indicia, wherein the one or more product indicia indicates selections of one or more products from the plurality of products;
determining, based on the one or more selected products and the first product category, a first set of products, of the plurality of products, that belong to the first product category and a second set of products, of the plurality of products, that do not belong to the first product category;
generating a search query based on the first product category, the first set of products, and the second set of products, wherein the search query uses a first conditional statement for products belonging to the first set of products and a second conditional statement for products belonging to the second set of products;

providing the search query to a backend server; and receiving, from the backend server, results from the search query.

16. The non-transitory computer-readable medium of claim 15, wherein the processor-executable instructions, when executed, further facilitate:

determining, based on the first user input, that the first product category is adopted;

determining, based on the first user input, that a second product category from the plurality of product categories is not adopted.

17. The non-transitory computer-readable medium of claim 15, wherein the first conditional statement for the products belonging to the first set of products is a conditional OR statement.

18. The non-transitory computer-readable medium of claim 15, further comprising:

receiving third user input associated with a second toggle button of from the plurality of toggle buttons, wherein the third user input indicates that a second product category from the plurality of product categories is adopted; and modifying the generated search query based on the third user input.

19. The non-transitory computer-readable medium of claim 18, wherein modifying the generated search query comprises:

determining a third set of products, of the plurality of products, that belong either to the first product category or the second product category; and modifying the search query to use the first condition statement for products belonging to the third set of products.

20. The non-transitory computer-readable medium of claim 15, wherein the second conditional statement for the products belonging to the second set of products is a conditional AND statement.

* * * * *